United States Patent [19]

Hauschopp et al.

[11] 4,391,471
[45] Jul. 5, 1983

[54] GUIDES FOR MINERAL MINING MACHINES

[75] Inventors: Alois Hauschopp, Werne; Hans-Dieter Schneider; Christoph Rassmann, both of Lunen, all of Fed. Rep. of Germany

[73] Assignee: Gewerkschaft Eisenhutte Westfalia, Lunen, Fed. Rep. of Germany

[21] Appl. No.: 249,315

[22] Filed: Mar. 31, 1981

[30] Foreign Application Priority Data

Apr. 2, 1980 [DE] Fed. Rep. of Germany ....... 3012884

[51] Int. Cl.³ .............................................. E21C 35/08
[52] U.S. Cl. ......................................... 299/43; 299/34
[58] Field of Search .............................. 299/32, 34, 43

[56] References Cited

U.S. PATENT DOCUMENTS

| 4,067,619 | 1/1978 | Peters et al. | 299/43 |
| 4,108,495 | 8/1978 | Hauschopp et al. | 299/43 |
| 4,205,882 | 6/1980 | Hauschopp et al. | 299/43 |
| 4,286,823 | 9/1981 | Merten et al. | 299/34 X |

FOREIGN PATENT DOCUMENTS

1171510 11/1969 United Kingdom .................. 299/34

Primary Examiner—Ernest R. Purser
Attorney, Agent, or Firm—Sughrue, Mion, Zinn, Macpeak & Seas

[57] ABSTRACT

A guide for mineral winning machines is composed of assemblies secured to the mineral face side of a conveyor. The assemblies have angle plates secured to the side walls of the conveyor pans and structures, integral or otherwise, which provide spacers at least partly defining elongate upper and lower passages for accomodating a drive chain. Covers are detachably and pivotably mounted to the structures to close off the upper passage. The covers are provided with substantial flat upper surfaces which serves to support and guide a machine. An upper guide rail formed by ribs at the edges of the upper surfaces and a lower guide rail formed by webs or web plates on the structures serve to locate with guide means of a plough supported on the inclined walls of the angle plates and driven by the drive chain. Where the flat support surfaces are not needed, or otherwise in case of need, the covers can be removed or replaced by covers of different design. In the latter case the upper guide rail can still be established by the different covers.

31 Claims, 8 Drawing Figures

GUIDES FOR MINERAL MINING MACHINES

BACKGROUND OF THE INVENTION

The present invention relates to guides for mineral winning and/or loading machines and particularly, but not solely, to guides for coal ploughs.

It is known to attach components to the mineral face side of a conveyor in an underground mine working to form a guide for a "swordless" plough. See for example German patent specification No. 2 746 727. The plough is usually driven with the aid of a chain running in upper and lower passages or channels at the mineral face side of the conveyor and protected within the guide. Spacers separate the upper and lower passages and to close off the upper passage it is known to provide pivotable covers or cover plates. These cover plates form part of a ramp-like guide surface for the plough. The cover plates are hinged at their lower sides so that they can be swung outwardly towards the mineral face to expose the upper chain passage. By providing gaps between the spacers the lower chain passage can also be exposed when the covers are pivoted to their open position. U.S. Pat. No. 4,108,495 describes a guide of this known type. To permit the cover plates to be detached and assembled with ease it is also known to construct the pivot joints for the cover plates as pintle hinges with tongues on the lower edges of the cover plates and by providing co-operative mountings on the spacers or on parts fixed thereto. German patent specification No. 2 540 215 describes hinges of this type.

In mineral mine workings it is also known to have a plough movable along a guide at the mineral face side of a conveyor as well as another machine which is guided for movement above the conveyor. It is then desirable to permit the machines to move past one another without impediment. German patent specification No. 1 286 478 describes an installation of this type.

Hitherto, various guidance systems and constructions have been adopted but in general each system and construction is largely only applicable to a certain type of mining machine and working and a general object of this invention is to provide a more versatile guide and guide assembly which can be modified quite simply to cope with different requirements and conditions.

SUMMARY OF THE INVENTION

In one aspect the present invention provides a guide for a mineral mining machine which guide comprises means defining upper and lower channels along which a drive chain is to be circulated and covers for covering at least the upper channel, which covers one mounted for pivoting and can be swung outwards for access to the upper channel; wherein the covers are detachable and have substantially wide, flat upper surfaces capable of performing a supportive function.

The defining means at least includes shaped pieces or spacers for separating the upper and lower channels or passages along which the drive chain moves. The guide also has angle plates with surfaces which form a lower support for a plough driven by the chain. Preferably structures, integral or otherwise, are mounted to upstanding portions of the angle plates which are detachably secured to the side walls of individual channel sections or pans of a conveyor. These structures provide the aforesaid spacers as well as webs or web plates which project downwardly from the spacers to provide a laterally-outward defining wall for the lower chain passage. Access to the upper chain passage can be provided by pivoting the covers outwardly while access to the lower passage can be provided by opening the upper passage and by removing intermediate spacers located between pair of spacers fixed to the structures. The web plates are conveniently spaced from the lower support surfaces of the angle plates which provide a lower wall for the lower chain passage to form a slot through which a drive connection is established between the plough and the chain. The lower support surfaces of the angle plates are constituted by the upper surfaces of inclined foot portions of the plates. The web plates may form a lower guide rail for the plough. A further guide rail for the plough or for some other machine can be provided by upstanding projections on the covers. The projections can delimit the upper support surfaces of the covers remote from the sides edges of upper regions of the covers providing these upper surfaces. In another construction, however, the covers have terminal side projections on their upper surfaces which form the guide rail. The delimiting type of projections preferably have flat outer surfaces which continue downwardly over the covers to lie co-planar with similar laterally-outer surfaces of the web plates. The delimiting type of projections would normally have a width significantly smaller that the upper support surfaces of the covers.

The pivot joints for the covers can be formed by bi-furcated projections on the covers which engage on pivot pins located in recesses in the web plates, or otherwise in the structures. The exteriors of these projections and interiors of the recesses can have curvilinear bearing surfaces which co-operate to retain the projections on the pivot pins when the covers are in their closed position and permit the detachment of the projections from the pivot pins when the covers are swung outwardly to a sufficient extent.

Conveniently, the overall guide is constructed from a series of guide assemblies connected end-to-end and each allocated to one channel section or pan of a scraper-chain conveyor. Each guide assembly may then consist of one of the angle plates which has an upstanding portion secured to a side wall of a pan of a scraper conveyor, a structure with a pair of said spacers and a web plate which projects downwardly from said spacers and is spaced from the lower surface of said one angle plate, said structure being detachably secured to said upstanding portion of the angle plate and at least one of said covers which is pivotably mounted to said structure and is detachably secured to the upstanding portion of the angle plate when in its closed position.

The connection means joining the guide assemblies together preferably permits slight canting displacement between the assemblies while resisting traction forces. A suitable mechanism for this purpose is a toggle member which engages in shaped pockets at the ends of adjacent guide assemblies in an easily accessible manner. The pockets, which are open towards the mineral face, can be aligned with the spacers and the recesses accomodating the cover hinge pins and formed in the web plates. The toggle members can be retained in position with the aid of detachable locking plates or the like. To provide adequate space for the toggle members and their pockets the recesses accomodating the hinge pins are preferably spaced inwardly from the ends of the structures. To inhibit the entry of fine material into the passages and to ensure the covers properly close off the upper chain passage, it is desirable to provide the ends of the covers with gap closure means. Shaped strip-like elements engaging in recesses can serve for this purpose.

Guides constructed in accordance with the invention can be used with ploughs or other form of machines, such as shearers, which extend over the associated conveyor or with both types of machines working simultaneously. Normally the other machine would be propelled by means external to the guide and would be supported inter alia by the flat upper surfaces of the covers. Nevertheless, the easy release of the covers allow covers of other designs to be used or for the covers to be removed entirely. Where a machine is supported on the upper surfaces of the covers, which are as wide as possible, the covers are preferably in good supportive contact with the angle plates. This can be achieved for example by webs on the undersides of the covers, opposite the upper support surfaces, which abut on bearing pieces welded to the upstanding portions of the angle plates. Threaded members, such as bolts, may be used to secure the covers to these upstanding portions. Conveniently the upper regions of the covers, defining their upper surfaces, extend over the side wall of the conveyor nearest the mineral face. By ensuring that the angle plates make firm contact with the floor of the working with their inclined foot portions the weight of the machine can be adequately supported through the covers and the angle plates. The machine supported in this fashion need not impede the plough supported by the inclined foot portions of the angle plates and both machines may work independently. The machine supported on the cover plates may have a gantry-like part extending over the conveyor and this part may be comparatively wide and arranged to ensure that transportation of material by the conveyor is unimpeded. To keep the width of the guide to a minimum it is advisable to have the flat coplanar surfaces of the web plates and the covers almost vertical. The material detached by the plough will nevertheless be guided into the conveyor over the resultant steep ramp guide surface as is desired.

Each guide assembly, mounted to one pan of the conveyor, conveniently has two cover plates. The individual covers will then have a moderate size and weight permitting the covers to be handled, mounted and demounted and pivoted between closed and open positions without difficulty.

Preferably the recesses accomodating the hinge pins for the covers are spaced apart along each structure and assembly with an intermediate common recess which receives projections at the adjacent ends of the two covers.

The guide can be modified by removing the covers, at least temporarily, to expose the upper chain passage over a section of its length. This removal may be desirable over the end zones of a mineral working where the drive chain is to be taken onto a sprocket wheel and where the wear caused by contact between the chain and its guide passage walls is particularly great. The provision of the detachable intermediate spacers is especially useful in this case since they close off the lower passage from the now-exposed upper passage yet permit access to the lower passage by virtue of their easy removal.

As will become apparent hereinafter, guides and guide assemblies constructed in accordance with the invention are exceptionally versatile and can be adapted for a variety of purposes, especially with combined winning operations performed with ploughs working in conjunction with other machines.

The invention may be understood more readily, and various other features of the invention, may become apparent from consideration of the following description.

BRIEF DESCRIPTION OF DRAWINGS

Embodiments of the invention will now be described, by way of examples only, with reference to the accompanying drawings, wherein.

DESCRIPTION OF PREFERRED EMBODIMENTS

In general, a guide intended for guiding a mineral winning machine, and more particularly, a coal plough is formed from guide assemblies or units arranged end-to-end and attached to the mineral, e.g. coal, face side of a scraper-chain conveyor. The conveyor is not shown in detail in the accompanying drawings but is composed in known manner of a series of channel sections or pans arranged end-to-end and preferably interconnected to permit some restricted movement therebetween. In the embodiments of the invention depicted in the accompanying drawings the reference numeral 11 is used to denote the mineral face side wall of one of conveyor pans itself denoted 10. Each guide assembly or unit is allocated to one of the conveyor pans and has an overall length corresponding to that of the associated pan. The guide assemblies then combine to form a more-or-less continuous guide along which the machine or plough is moved to win mineral, e.g. coal, from the mineral face of an underground mine working. The guide is particularly designed for use with ploughs of the type which do not employ a sword or base plate projecting beneath the conveyor, i.e. the so-called swordless ploughs. Throughout the drawings the same reference numerals denote similar or equivalent features.

Figure 2:
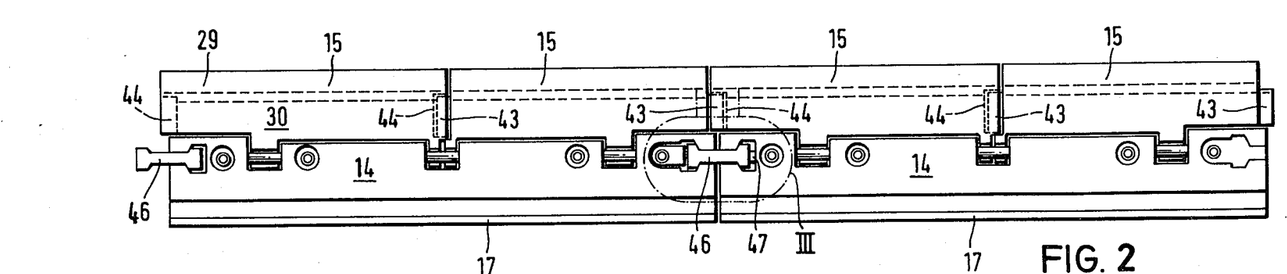
FIG. 2 is a side view of the part of the guide shown in FIG. 1 as viewed from the mineral face which is being worked.
Figure 3:
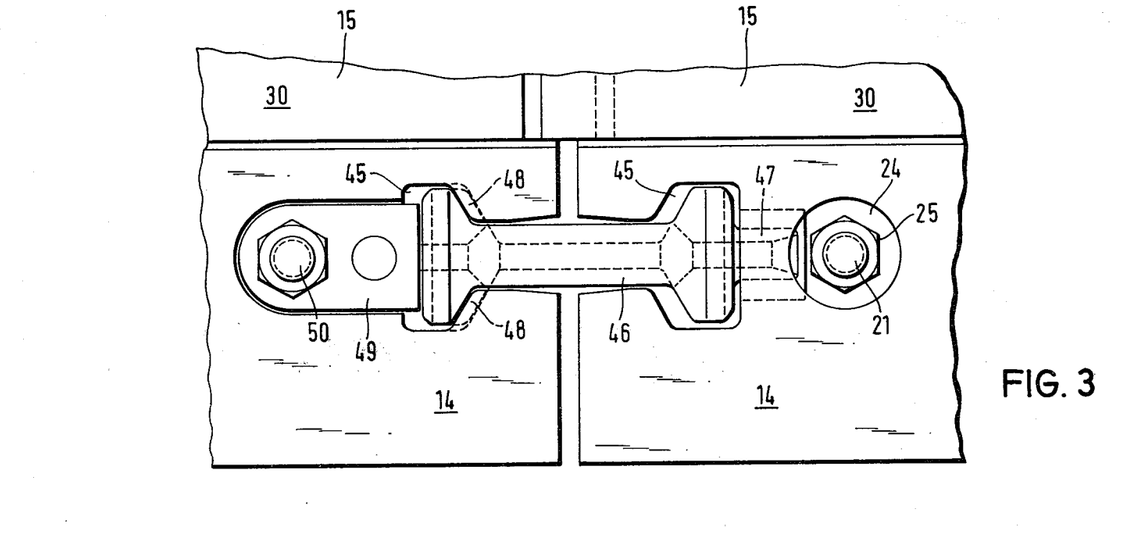
FIG. 3 is an enlarged side view of the junction between two of the guide assemblies and corresponding to detail III in FIG. 2.
Figure 4:
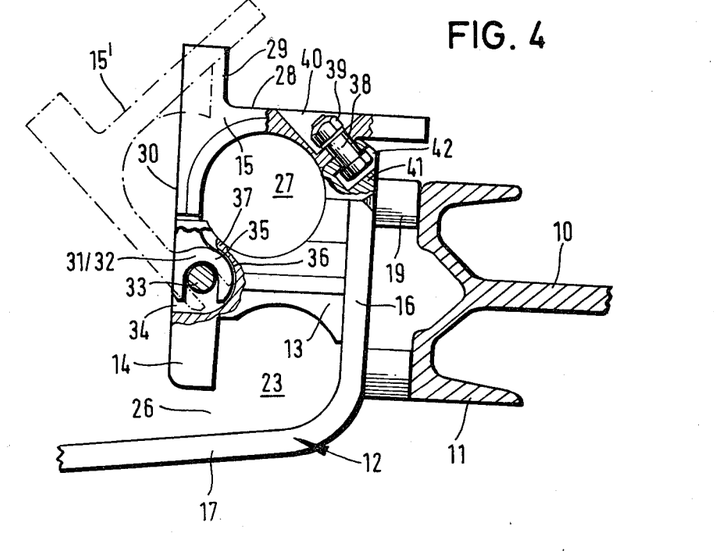
FIGS. 4 and 5 are different part-sectional end views of the guide shown in FIGS. 1 to 3.
Figure 5:
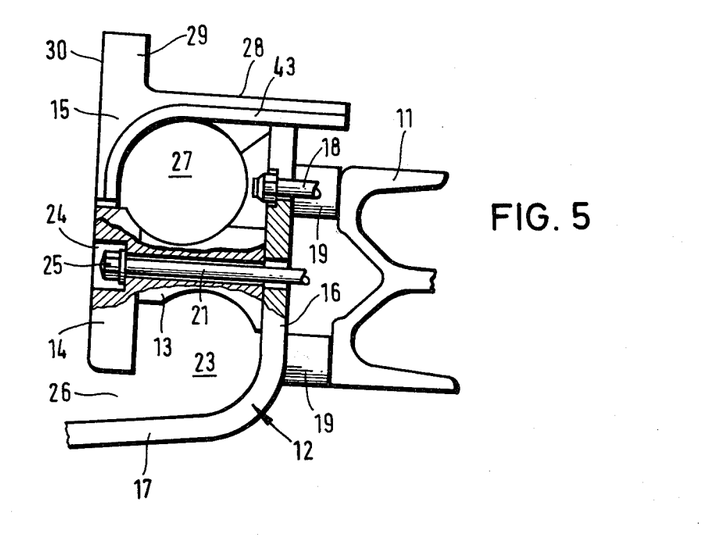

Referring now to FIGS. 1 to 5, the guide depicted therein is composed of L-shaped angle plates 12, spacers 13 and covers 15 all respectively arranged end-to-end. Each of the plates 12 has an upstanding portion 16 secured to the side wall 11 of an associated pan 10 and a lower outwardly projecting foot portion 17 which adopts a horizontal or near horizontal disposition. The length of each plate 12 is approximately the same as the pan 10 to which it is attached and forms one of the guide assemblies. The portions 17 of the plates 12 are intended to rest on the floor of the working and combine to form a ramp-like support or slideway for the plough (not shown). In addition, the portions 17 are located below the lower flanges 20 of the side walls 11 of the pans 10 so as to also support the conveyor at the mineral face side. The portions 17 can be slightly inclined in relation to the floor of the working as shown in FIG. 4. The support or slideway formed by the portions 17 of the plates 12 may also serve to limit the depth of cut of the plough. In this case the portions 17 project beyond the plough body and can engage on the mineral face at its juncture with the floor to determine the depth of cut. This is not critical to the invention, however, and the portions 17 need not project beyond the plough body if the cut limitation is not necessary. Threaded members such as bolts 18 (FIG. 5) are used to detachably secure the portions 16 of the plates 12 to the side walls 11 of the pans 10. In known manner the heads of these bolts 18 locate in retention pockets defined by members 19 fixed as by welding to the exteriors of the side walls 11. Each pan 10 and each guide assembly has in addition to the angle plate 12 an integral structure defining at least a pair of spacers 13. Each spacer 13 has a length somewhat less than half the length of the pan 10 so that the spacers 13 of each structure and each guide assembly are spaced apart to form a gap therebetween. This gap is identified by reference numeral 22 in FIG. 8. The structures are all fixed to the portions 16 of the plates 12 with the aid of bolts 21 which extend through aligned bores in the spacers 13 and the plate portions 16. The heads of these bolts 21 may also locate in retention pockets defined by further fixings on the exteriors of the side walls 11 and these fixings may take the form of barrier plate holders (not shown) which are often provided on the side walls 11. Alternatively, these fixings may be integral with one or both of the members 19 used to retain the heads of the bolts 18.

The structures providing or defining the spacers 13 are also provided with external recesses 24 which receive the nuts 25 engaged on the threaded stems of the bolts 21. Each structure has a lower continuous region forming a web or web plate 14 which interconnects and bridges the spacers 13 thereof. Each web 14 has a length corresponding to that of the associated pan side wall 11 and hence the guide assembly. Instead of providing integral structures defining the spacers 13 and webs 14 it is possible to form each of these structures from separate parts, i.e. a pair of spacers 13 and a plate or bar forming the web 14, which are connected together by welding or by screws or bolts for example. The webs 14, however formed, serve as a lower guide rail for the plough. The webs 14 are spaced from the portions 17 of the plates 12 to form a slot 26. The plough has one or more arms or the like which extend through this slot 26 and connect with one or more guide blocks which engage around the webs 14 in the manner of a hook. The spacers 13 separate and partly define an upper and a lower passage or channel 27, 23 in which a chain used to propel the plough is circulated. The lower run of the chain located in the lower channel 23 forms a haulage run and the lower run is connected to the plough via the guide block (s) and guide arm (s). The upper run of the chain located in the upper channel 27 forms the return run. The gaps 22 between the spacers 13 permit ready access to the channel 23.

Each pan and each guide assembly also has two covers 15. The length of each cover 15 is approximately one half of the length of the associated pan 10 so that the covers 15 combine to close-off the upper channel 27.

Each cover 15 is characterized by a comparatively wide, flat upper support surface 28 which is approximately horizontal. An upwardly-projecting rib portion 29 delimits the surface 28 in the direction towards the working face. The width of this portion 29, i.e. towards the working face, is considerably less than the width of the adjacent support surface 28. With the covers 15 in their closed position the rib portions 29 combine to form an upper guide rail for the plough or for another machine. As with the lower rail, the plough or other machine has one or more arms or the like which preferably engage in hook-like manner over the portions 29.

Figure 1:
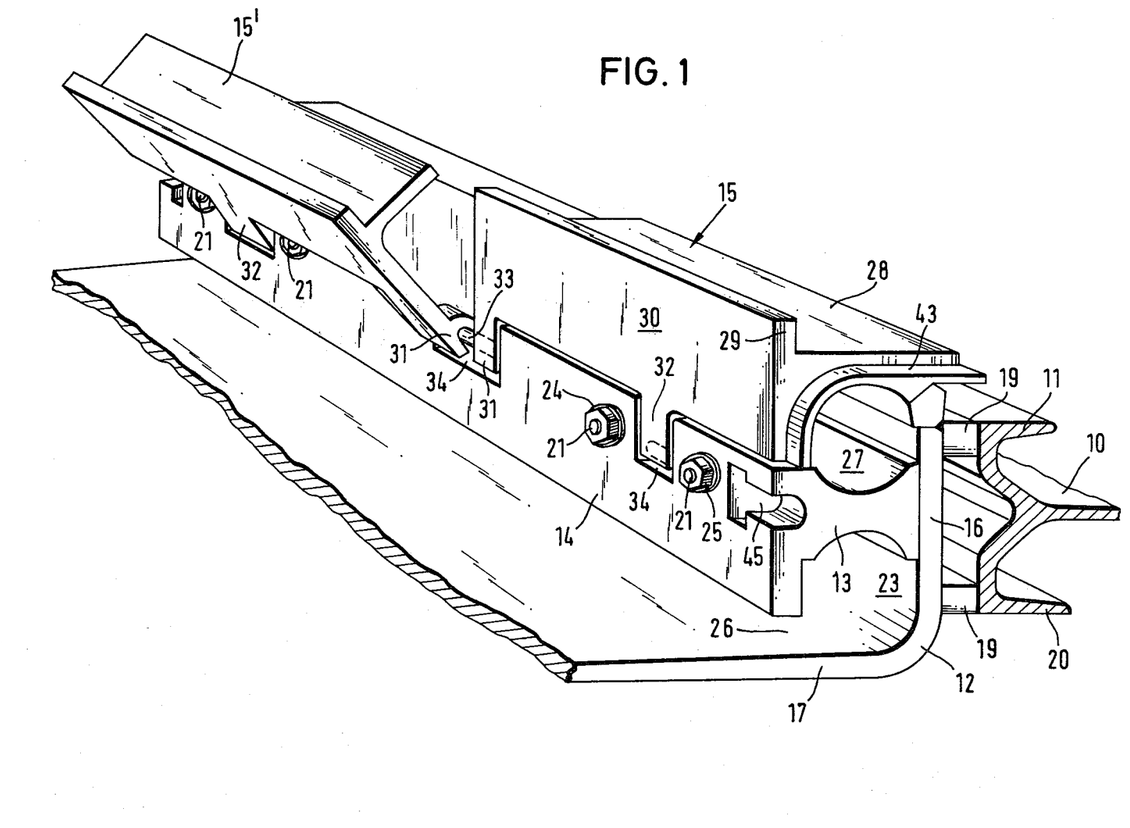
FIG. 1 is a perspective schematic view of a part of guide and of a guide assembly constructed in accordance with the invention.

The covers 15 are individually pivotable between closed and open positions as represented in FIG. 1, where the reference numeral 15′ designates a cover which is being pivoted towards the mineral face to adopt its open position.

The covers 15 each have a modified and transposed T-shaped cross-section, with a first region constituting the "cross-piece" of the 'T' which is generally upstanding when the cover 15 is in its closed position. The rib portion 29 forms part of this first region which has a width which generally matches the webs 14 when the cover 15 is closed. The outer face 30 of this first region, effectively forming the cross-piece of the 'T', is arranged to be co-planar with the outer face of the associated structure forming the spacers 13 and the web 14. The other region of the cover 15 which represents the 'upright' of the 'T' extends laterally when the cover 15 is in the closed position and defines the upper surface 28. The co-planar outer faces of the covers 15 and the structures 13, 14 present a flat profile to the mineral face, and these faces preferably extend at an angle of about 10°–20° to the vertical to provide a ramp-like material guide surface. The first regions of the covers 15 defining the faces 30, have bi-furcated lower projections 31, 32 which serve to mount the covers 15 for pivoting. Each cover 15 has one such projection 31 at one end and another such projection 32 spaced from or intermediate its ends. The projections 31, 32 of each cover 15 are otherwise identical and engage on hinge pins 33 (FIG. 4). These pins 33 are spaced inwardly from the external faces 30 and locate in protective recesses 34 in the structures 13, 14 which receive the projections 31, 32. The recesses 34 present a rectilinear profile to the exterior as do the projections 31, 32 as depicted in FIG. 1. As shown in FIG. 4, the arms of each of the projections 31, 32 have a curvilinear inner profile 35 which provides an inner curvilinear surface matching the curvature at the associated pin 33 so as to seat on the latter. The curvilinear profile of the arms of each of the projections 31, 32 also provides an outer curvilinear surface, and inner surfaces 36 of the recesses 34 are correspondingly curved to guide the projections 31, 32 as they are swivelled about the pins 33. The surfaces 36 thus act as bearings. The bearing surfaces 36 also extend over wall portions 37 of the recesses 34 which project outwardly towards the mineral face to engage over the projections 31, 32 in hook-like manner. This ensures that when the covers 15 are located in their closed position these wall portions 37 engage over the projections 31, 32 to ensure that the covers 15 cannot be lifted off the pins 33. By pivoting the covers 15, as shown by the chain-dotted line 15′ in FIG. 4, the covers 15 can easily be withdrawn from the pins 33, however. As shown in FIG. 1, the projections 31 at the mutuallyfacing ends of two adjacent covers 15 locate in one common recess 34 and engage on one common pin 33. In contrast, the projections 32 of these covers 15 each locate in its own individual associated recess 34 and on its own individual pivot pin 33. The common recesses 34 thus have a length approximately twice that of the individual recesses 34.

The covers 15 are detachably secured in their closed position with the aid of short bolts 38 shown in FIG. 4. As illustrated in FIG. 4, the upstanding portions 16 of the angle plates 12 are provided with bearing pieces 41 which may take the form of continuous bars or of short bar sections welded to the plates 12. These bearing pieces 41 have recesses 42 which are shaped to retain the heads of the bolts 38. The threaded stems of these bolts 38 extend through bores in additional webs provided at the undersides of the other regions of the covers 15, i.e. opposite the surfaces 28. These webs also have recesses 40 communicating with the bores and accessible from the surfaces 28. The recesses 40 accomodate nuts 39 engaged on the threaded stems of the bolts 38. In order to swing the covers 15 to their open position, or to remove the covers 15, it is first necessary to release the nuts 39 and then when the covers 15 are pivoted forward (chain-dotted line 15' in FIG. 4) the bolts 38 can be removed, if desired. When the covers 15 are in their closed positions the webs providing the bolt-reception bores and recesses 40 engage on the bearing pieces 41 and are thus supported by the portions 16 of the plates 12. The other regions of the covers 15, defining the surfaces 28, project over and beyond the portions 16 of the plates 12 when the covers 15 adopt their closed positions to terminate in a position more-or-less co-planar with the exteriors of the side walls 11 as shown in FIG. 4. The upper surfaces 28 of the covers 15 provide guidance and support for another machine (not shown), and the engagement between the plough or machine and the rail formed by the rib portions 29 is such as not to encroach unduly on the support surfaces 28.

As shown in FIGS. 1 and 2, the covers 15 are additionally provided with gap-closure means. More particularly, each alternate cover 15 has shaped strip-like elements 43 at both ends, each of which matches the curvature of the channel 27 and also projects towards the conveyor to follow the region defining the surface 28. The other covers 15, which are arranged between these covers 15 with the elements 43, are alternatively formed with shaped recesses 44 at their ends designed to fit snugly over the elements 43. The elements 43 and the associated recesses 44 at the ends adjacent covers 15 thus combine to close-off the gaps between the covers 15, and the engagement of the elements 43 and the recesses 44 also provides an additional supportive function. It follows that the covers 15 with the elements 43 can only be pivoted to their open position when the intermediate covers 15 with the recesses 44 have first been pivoted.

The individual guide assemblies, each composed of the angle plate 12, the structure with the spacers 13 and the web 14 and the covers 15 are interconnected with the aid of connection means which resists traction force directed along the conveyor while permitting a certain degree of free movement in both the lateral and vertical senses. This connection means can replace or supplement similar connection means normally used to connect the pans 10 of the conveyor together. FIGS. 2 and 3 depict a suitable form of connection means for the guide assemblies. As shown particularly in FIG. 3, the connection means linking a pair of adjacent guide assemblies together takes the form of a toggle member 46 engaging in appropriately-shaped pockets 45 at the adjacent ends of the guide assemblies. The pockets 45 are actually provided in the ends of the structures 13, 14 and in positions which lie more-or-less on the longitudinal axis of the spacers 13 and on the median plane passing through the bolts 21 and the recesses 34. The provision of the projections 32 on the covers 15 spaced inwardly from their ends provide adequate space for the pockets 45 and the toggle member 46. The toggle member 46 has an H-shaped profile with a central portion and enlarged end portions. One end portion of the toggle member 46 has an axial bore which receives a fixing pin 47 which engages behind a rear wall surface of the pocket 45. The other end portion of the toggle member 46 is provided with a shaped projection 48 which likewise engages behind a rear wall surface of the other pocket 45. In this way the toggle member 46 is retained in the pockets 45. A locking element serves to prevent axial displacement of the toggle member 46. The locking element is composed of a plate 49 which is detachably secured to one of the structures 13, 14 with the aid of a screw or bolt 50. The shape of the toggle member 46 and the pockets 45 resists axial tensile force but permits slight canting between the guide assemblies. Such a connection means is known per se for conveyor pans. To release the toggle member 46, the screw or bolt 50 is first released to permit the plate 49 to be removed thereby allowing the toggle member 46 to be displaced to the left of FIG. 3 to release the pin 47 and the projection 48 from their engagement in the pockets 45. The toggle members 46 and their locking plates 49 are readily accessible from the exterior of the guide assemblies.

Figure 6:
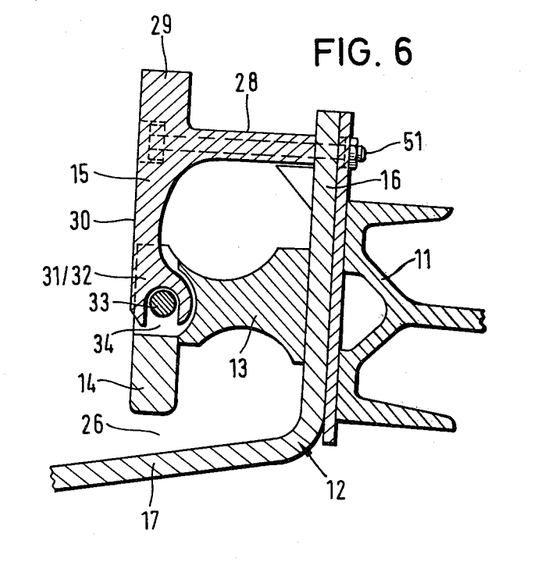
FIG. 6 is a sectional end view of a modified form of guide and guide assembly constructed in accordance with the invention.

FIG. 6 depicts a modified construction, wherein the comparatively short inclined bolts 38 used in the construction depicted in FIGS. 1 to 5 to secure the covers 15 in their closed position are replaced by somewhat longer bolts 51 which now extend more-or-less horizontally through bores projecting through the other regions of the covers 15 defining the surfaces 28 and through bores in the portions 16 of the plates 12.

Figure 7:
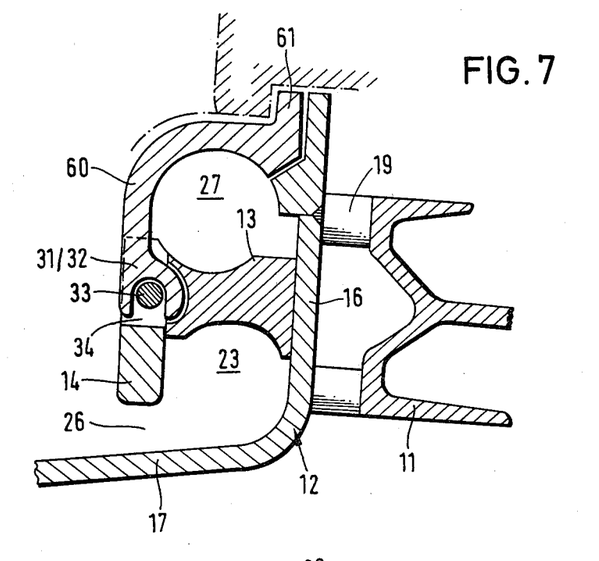
FIG. 7 is a sectional end view of another modified form of guide and guide assembly constructed in accordance with the invention.

The guide and guide assemblies as described can be used optionally to guide a plough or another form of winning machine such as a shearer which extends above the conveyor and is supported on the surfaces 28 and guided by the rib portions 29 of the covers 15 or a combination of winning machines. In all these modes of operation the guide provides adequate stability yet is easy to assemble and demount. The guide and guide assemblies are versatile and can be modified in case of need without great effort or cost such as by removing some or all of the covers 15 or by replacing the covers 15 as described with covers of some other design. FIG. 7 shows another modified construction where the guide and assemblies shown in FIGS. 1 to 5 have the covers 15 replaced by different covers. In the FIG. 7 construction the replacement covers, designated 60, have no inwardly projecting region defining the guide and support surfaces 28. Instead the modified covers 60 have enlarged terminal edge portions 61 which seat onto the bearing pieces and also provide a guide rail for the plough or winning machine (c.f. 29 FIG. 1).

FIG. 7 depicts in schematic outline part of a winning machine engaging with the guide rail thus formed. The covers 60 and other components of the guide may otherwise by much the same as the covers 15 previously described with the projections 31, 32, etc.

Figure 8:
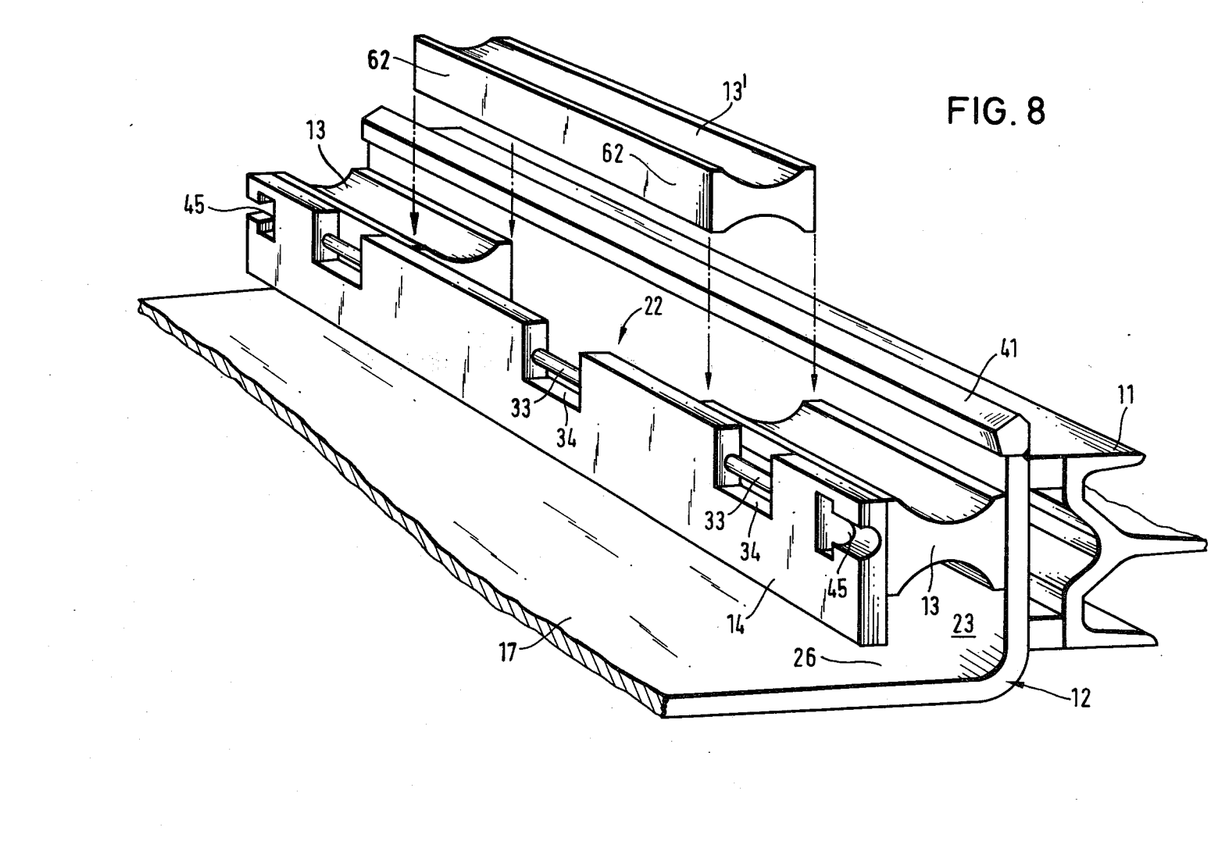
FIG. 8 is a perspective schematic view of part of a modified guide and a guide assembly generally corresponding to FIGS. 1 to 5 but with the covers removed.

FIG. 8 depicts a modified construction for a guide assembly, where the covers are omitted. This is useful over end zone sections of the guide. As shown in FIG. 8, the guide assembly has the angle plate 12 as before and a web plate 14. These components 12, 14 each have a length corresponding to that of the conveyor pan 10. Two spacers 13 are spaced apart and are welded or otherwise secured to the web plate 14 or to the angle plate 12. It is possible to fabricate the web plate 14 and the spacers 13 as an integral structure. The spacers 13 and the plates 14, 12 again define part of a lower channel 23 for the chain used to drive the plough. However, no covers are employed so that the upper run of the chain above the spacers 13 is left exposed. To provide continuity, an intermediate third spacer 13' is located in the gap 22 between the main spacers 13. This intermediate spacer 13' is detachably secured in position, for example, by means of bolts which engage through alignable bores (not shown) in the spacer 13' and the web plate 14. The spacer 13 can thus be selectively removed to provide access to the lower channel 23. The plate 12 has a bar forming the aforementioned bearing piece 41 and the assembly is otherwise constructed as described in connection with FIGS. 1 to 5.

We claim:

1. A guide assembly for attachment to a side wall of a conveyor to form part of a mineral winning machine guide; said guide assembly comprising an angle plate with an upstanding first portion for securing to the side wall and a second foot portion inclined thereto to form a lower support for the machine, a structure fixed to the first portion of the angle plate and including spacers spaced apart along the assembly to separate upper and lower chain guide passages defined by at least the structure and the angle plate and covers pivotably mounted to the structure and serving to close off the upper chain guide passage, access to both the passages being established by swinging the covers outwardly from the first portion of the angle plate, wherein the covers are provided with substantially flat upper surfaces which form part of a support and guiding surface for another machine and ribs at one side of the upper surfaces which form part of a guide rail for one of the machines.

2. A guide assembly according to claim 1, wherein the covers and the structures have aligned outer surfaces collectively forming a substantially upstanding first guide surface for the machine.

3. A guide for mineral mining; said guide comprising means defining upper and lower chain passages for receiving a chain used to drive a plough, the defining means including spacers separating the upper and lower passages, angle plates with surfaces which form a lower support for the plough and covers which close off the upper passage and which are pivotable outwardly from the upper passage to permit across thereto, wherein the covers have flat upper surfaces which serve to contact and support a machine and a guide rail for the plough or machine is formed by projections on the covers delimiting the upper surfaces.

4. A guide according to claim 3, wherein the angle plates have upstanding portions fixed to a side wall of a scraper-chain conveyor and inclined foot portions which provide the lower support for the plough and define the underside of the lower passage and wherein the covers have regions extending over the upstanding portions of the angle plates and defining the upper surfaces.

5. A guide according to claim 4, wherein the covers are supported in their closed position on the upstanding portions of the angle plates.

6. A guide according to claim 5, wherein the covers are detachably secured in their closed position to the upstanding portions of the angle plates.

7. A guide according to claim 6, wherein the covers are provided with webs on the undersides opposite the upper surfaces and the upstanding portions of the angle plates have bearing pieces which contact the webs.

8. A guide according to claim 6, wherein the covers have recesses accessible from the upper surfaces which accomodate nuts engaged on bolts held to the upstanding portions of the angle plates.

9. The guide according to claim 5, wherein the covers are detachably secured in their closed position with bolts projecting through bores in the covers and the upstanding portions of the angle plates.

10. A guide according to claim 3, wherein structures are fixed to the angle plates and include said spacers and web plates which project downwardly from the spacers to outwardly define the lower passages, the web plates being spaced from the lower surfaces of the angle plates to form a slot which permits drive connection to be established between the chain run in the lower passage and the plough.

11. A guide according to claim 10, wherein the structures have the spacers and web plates formed integrally.

12. A guide according to claim 10, wherein the structures have recesses which accomodate pivot pins, the recesses serving to receive bi-furcated projections at the lower regions of the covers which seat onto the pivot pins to render the covers pivotable.

13. A guide according to claim 12, wherein each structure has a plurality of said recesses spaced apart along its length and there is an intermediate common recess which receives projections at the adjacent ends of two of the covers.

14. A guide according to claim 12, wherein the exteriors of the projections and the interiors of the recesses have curviliner surfaces which co-operate to retain the projections on the pivot pins when the covers are in their closed position and permit the detachment of the projections from the pivot pins when the covers are swung outwardly to a sufficient extent.

15. A guide according to claim 12, wherein the pivot pins are aligned with the spacers.

16. A guide according to claim 10, wherein each structure has a pair of spacers which are separated by a gap therebetween and separate intermediate spacers are detachably mounted to the structures to lie within the gaps.

17. A guide according to claim 16, wherein each structure has a web plate which extends over the length of the pair of spacers and bridges the gap therebetween.

18. A guide according to claim 10, wherein the web plates and the covers have substantially flat co-planar outer surfaces when the covers are in their closed position.

19. A guide according to claim 10, wherein the web plates also form a lower guide rail for the plough.

20. A guide according to claim 3, wherein the spacers connect with web plates which project downwardly from the spacers to outwardly define the lower passages, the web plates being spaced from the lower surfaces of the angle plates to form a slot which permits drive connection to be established between the chain run in the lower passage and the plough.

21. A guide according to claim 20, wherein the web plates have recesses which accomodate pivot pins, the recesses serving to receive bi-furcated projections at the lower regions of the covers which seat onto the pivot pins to render the covers pivotable.

22. A guide according to claim 3, wherein the covers have inter engageable gap closure means at their ends.

23. A guide according to claim 22, wherein the gap closure means comprises shaped strip-like elements at the ends of alternate covers and correspondingly shaped recesses at the ends of the other covers.

24. A guide according to claim 3, wherein the guide is constructed from assemblies, each composed of one of the angle plates which has an upstanding portion secured to a side wall of a pan of a scraper conveyor, a structure with a pair of said spacers and a web plate which projects downwardly from said spacers and is spaced from the lower surface of said one angle plate, said structure being detachably secured to said upstanding portion of the angle plate and at least one of said covers which is pivotably mounted to said structure and is detachably secured to the upstanding portion of the angle plate when in its closed position.

25. A guide according to claim 24, wherein the assemblies are interconnected with connection means which permits slight canting displacement between the assemblies while resisting traction forces.

26. A guide according to claim 25, wherein the connection means comprises toggle members engaging in shaped pockets in the structures at adjacent ends of the assemblies and detachable locking elements which retain the toggle members in the pockets.

27. A guide according to claim 26, wherein the covers have lower bi-furcated projections which engage on hinge pins accomodated in recesses formed in the structures, each cover having one said projection at one of its ends and another said projection between its ends and each structure having recesses which are spaced apart from one another and from the ends thereof and the shaped pockets at its ends generally align with the recesses.

28. A guide according to claim 27, wherein each structure has an intermediate recess which receives the projections at the adjacent ends of a pair of said covers.

29. A guide for mineral mining; said guide comprising means defining upper and lower passages along which a drive chain is to be circulated, the defining means including spacers separating the upper and lower passages, angle plates with upstanding portions securable to one side of a scraper-chain conveyor and lower portions forming a support for a machine guided by the guide, and pivotable covers which close off the upper passage; wherein the defining means and the covers have alignable outer surfaces collectively forming a substantially upstanding first guide surface for a machine, and the covers have upper surfaces which form a second guide surface delimited by upstanding projections forming a guide rail.

30. A guide according to claim 29, wherein the upstanding projections form a continuation of said first guide surface.

31. A guide according to claim 29, wherein structures are fixed to the angle plates and include said spacers and web plates which project downwardly from the spacers to outwardly define the lower passages, the web plates being spaced from the lower surfaces of the angle plates to form a slot which permits drive connection to be established between the chain run in the lower passage and a machine, and wherein the web plates and the covers provide said substantially upstanding first guide surface.

* * * * *